(12) United States Patent
Sano et al.

(10) Patent No.: US 7,895,752 B2
(45) Date of Patent: Mar. 1, 2011

(54) SPOKED WHEEL DISK MANUFACTURING METHOD AND SPOKED WHEEL

(75) Inventors: Tetsu Sano, Tokyo (JP); Yoshinobu Sakashita, Tokyo (JP); Kei Takagi, Tokyo (JP); Kikuya Ito, Tokyo (JP)

(73) Assignee: Topy Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/738,698

(22) PCT Filed: Oct. 17, 2008

(86) PCT No.: PCT/JP2008/068869
§ 371 (c)(1),
(2), (4) Date: Jun. 24, 2010

(87) PCT Pub. No.: WO2009/051230
PCT Pub. Date: Apr. 23, 2009

(65) Prior Publication Data
US 2010/0253134 A1    Oct. 7, 2010

(30) Foreign Application Priority Data
Oct. 19, 2007   (JP) ................................ 2007-272009
Oct. 17, 2008   (JP) ................................ 2008-268178

(51) Int. Cl.
B23P 17/00    (2006.01)
(52) U.S. Cl. ............ 29/894.325; 29/894.32; 29/894.323; 29/894.324; 301/64.101; 301/64.102
(58) Field of Classification Search ............... 29/894.32, 29/894.323, 894.324, 894.325; 301/63.106, 301/64.101, 64.102, 64.704, 66
See application file for complete search history.

(56) References Cited

U.S. PATENT DOCUMENTS
1,711,833 A * 5/1929 Crissman ................. 29/894.344
(Continued)

FOREIGN PATENT DOCUMENTS
EP    1 262 333    3/2003
(Continued)

OTHER PUBLICATIONS
International Preliminary Report on Patentability corresponding to International Patent Application No. PCT/JP2008/068868 dated Apr. 20, 2010.
(Continued)

*Primary Examiner* — David P Bryant
*Assistant Examiner* — Ryan J Walters
(74) *Attorney, Agent, or Firm* — Jenkins, Wilson, Taylor & Hunt, P.A.

(57) ABSTRACT

A method comprising: a step of preforming a plurality of bulging portions on a substantially circular plate blank, the bulging portions being located concentrically and circumferentially outward of a bolt hole, each of the bulging portions being a base of a reinforcing portion of a spoke; a step of forming a plurality of prototypical decorative holes on the respective bulging portions to form a prototypically-shaped spoke between the adjacent prototypical decorative holes; a step of forming a disk flange by bending an outer circumferential portion of the plate blank, on which the prototypical decorative holes are formed, at a right angle to be substantially parallel to a wheel axial direction, so that an outer periphery of a resultant decorative hole forms an upper end edge of the disk flange; and a step of forming the spoke by providing the prototypically-shaped spoke with the reinforcing portion.

2 Claims, 6 Drawing Sheets

U.S. PATENT DOCUMENTS

| | | | | |
|---|---|---|---|---|
| 2,159,880 A | * | 5/1939 | Bierwirth et al. | 29/894.344 |
| 3,391,439 A | * | 7/1968 | Bulgrin et al. | 29/894.325 |
| 5,388,330 A | * | 2/1995 | Daudi | 29/894.323 |

FOREIGN PATENT DOCUMENTS

| | | |
|---|---|---|
| JP | 63-108924 | 5/1988 |
| JP | 7-100206 | 11/1995 |
| JP | 09-095101 | 4/1997 |
| JP | 3460764 | 4/1997 |
| JP | 11-254901 | 9/1999 |
| JP | 2004-1704 | 1/2004 |
| JP | 2004-243925 | 9/2004 |
| JP | 2005-35330 | 2/2005 |
| JP | 2005-119355 | 5/2005 |
| JP | 2006-275536 | 10/2006 |
| JP | 2007-191025 | 8/2007 |
| WO | WO2009/051230 | 4/2009 |
| WO | WO2009051229 | 4/2009 |

OTHER PUBLICATIONS

International Search Report corresponding to International Patent Application No. PCT/JP2008/068868 dated Jan. 20, 2009.

Notification of Transmittal of Translation of the International Preliminary Report on Patentability (Chapter I or Chapter II of the Patent Cooperation Treaty) corresponding to International Patent Application No. PCT/JP2008/068869 dated May 20, 2010.

Written Opinion corresponding to International Patent Application No. PCT/JP2008/068868 dated Jan. 20, 2009.

Written Opinion corresponding to International Patent Application No. PCT/JP2008/068869 dated Jan. 20, 2009.

International Search Report corresponding to Japanese Patent Application No. PCT/JP2008/06889 dated Jan. 20, 2009.

* cited by examiner

[Fig1]
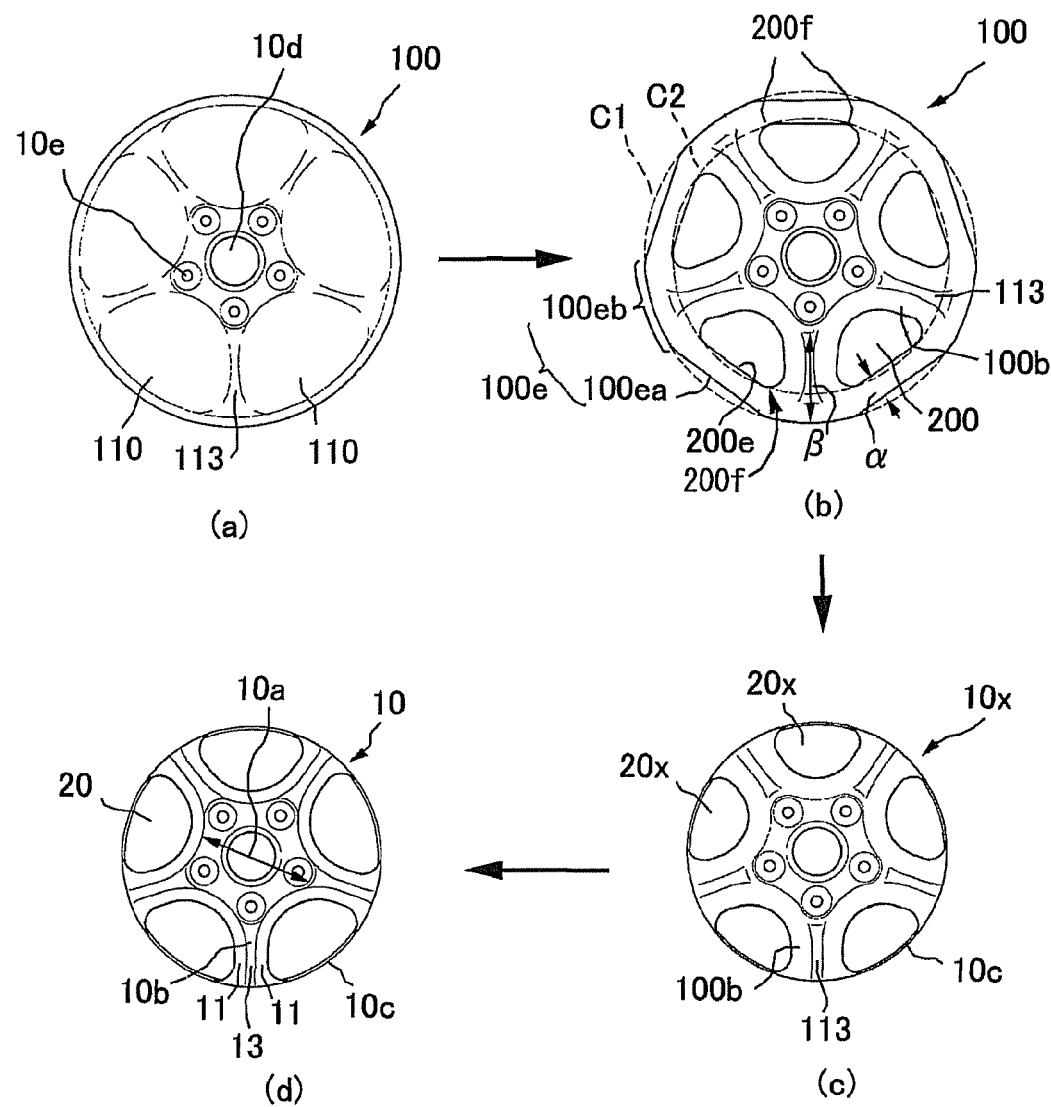

[Fig2]
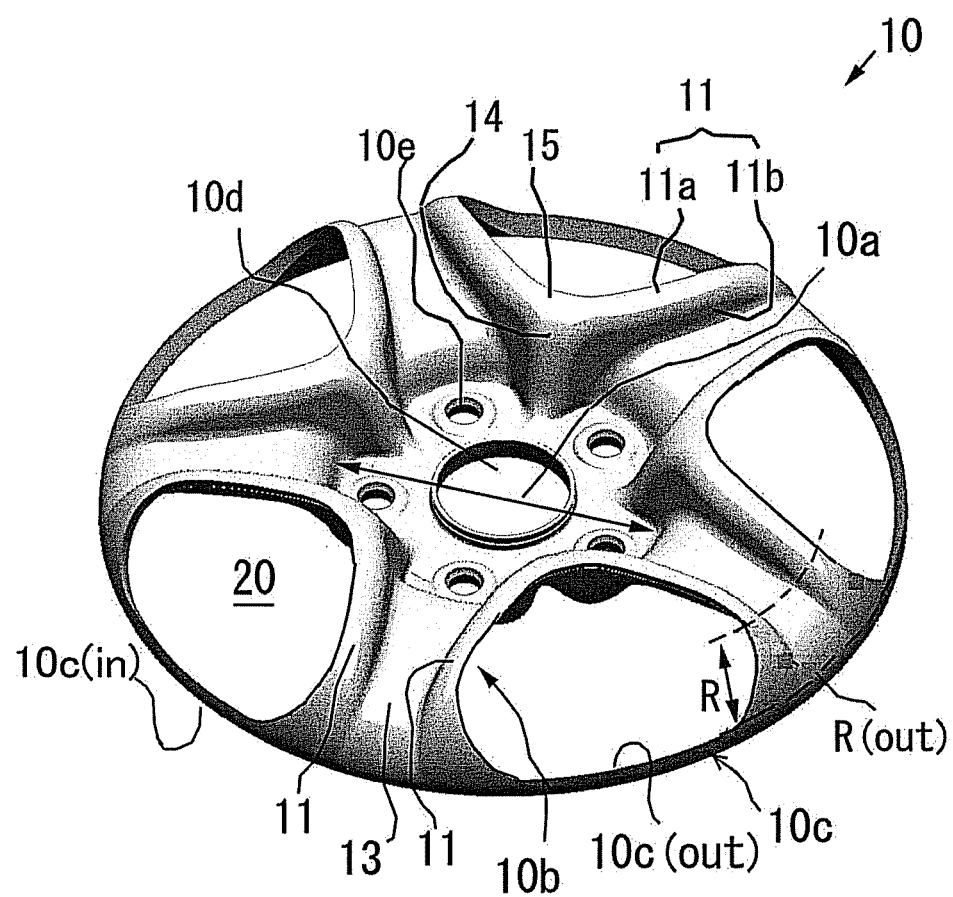

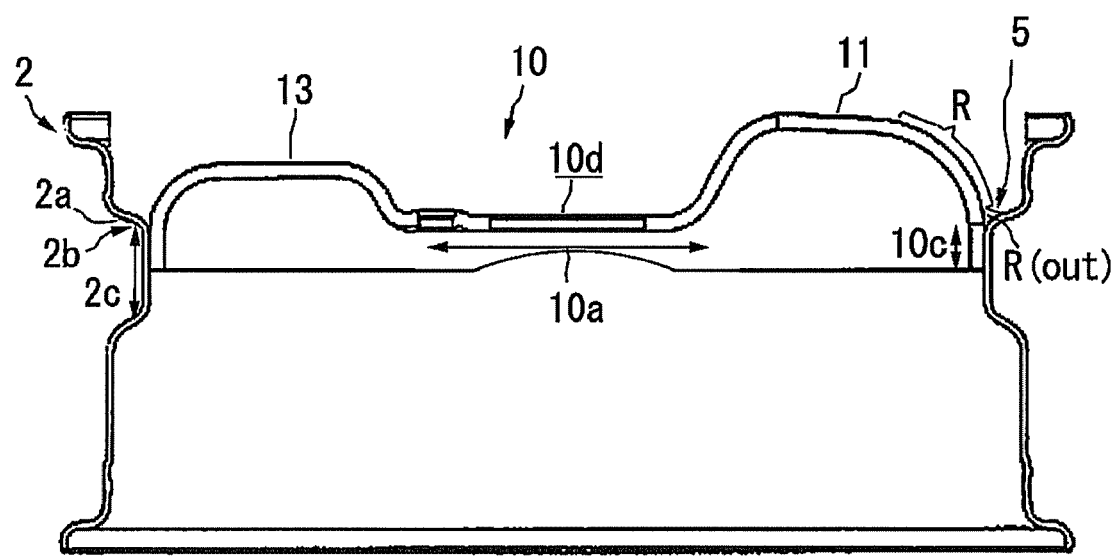
[Fig3]

[Fig4]
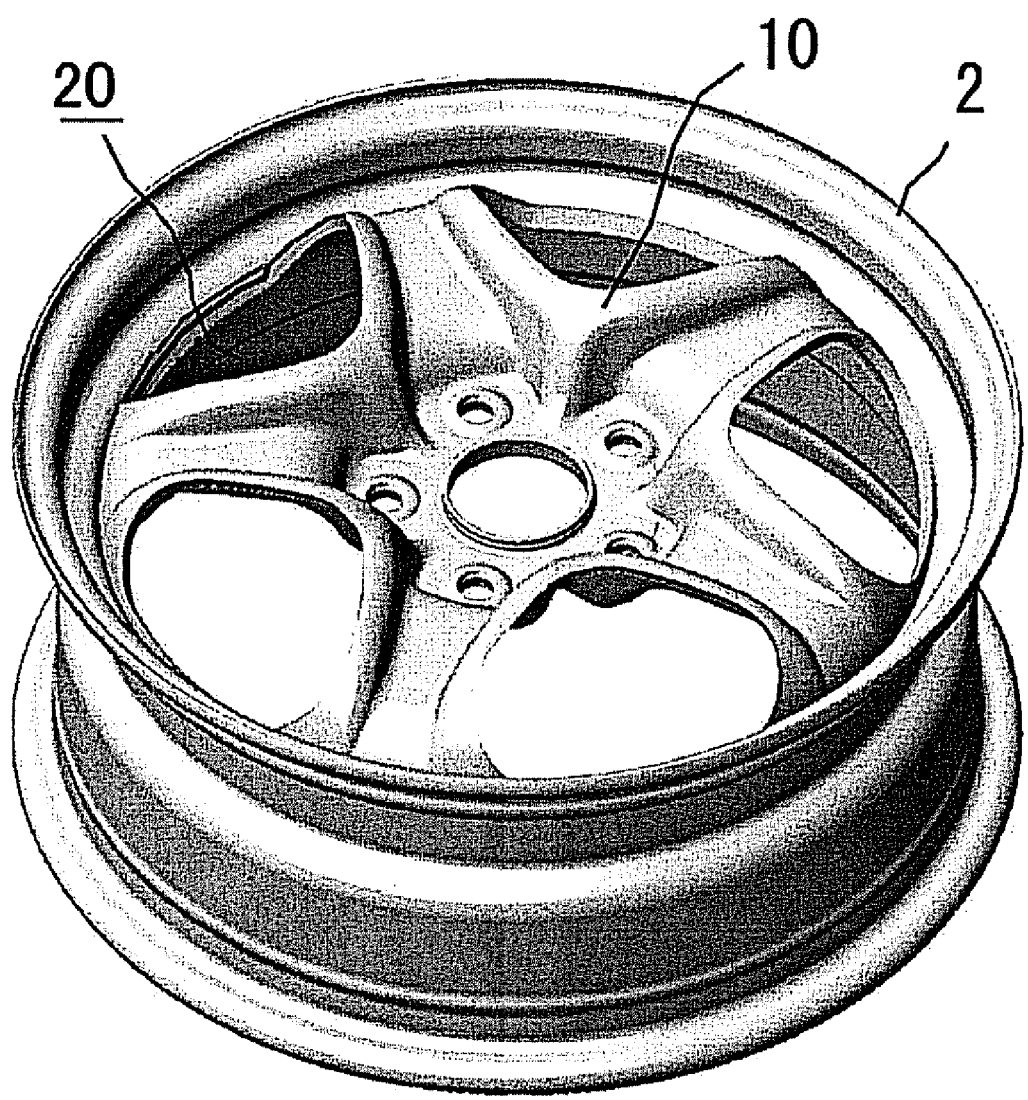

[Fig5]
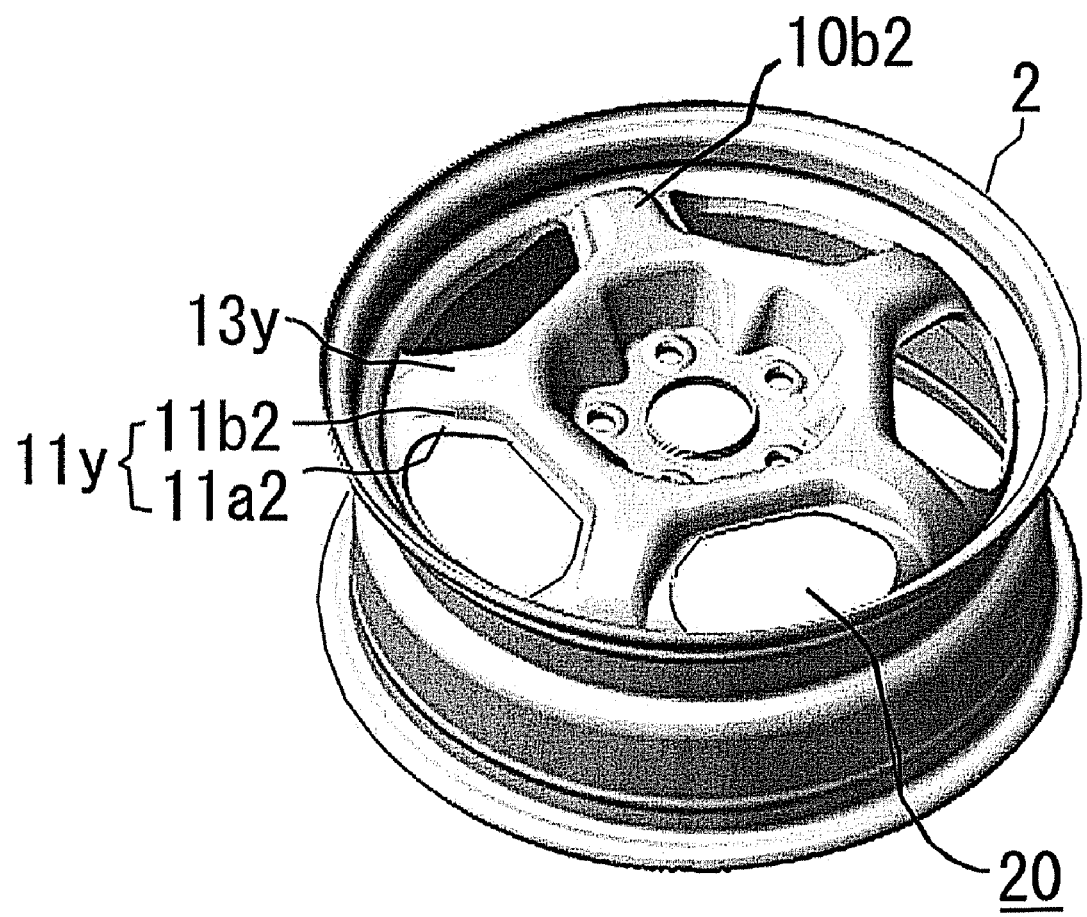

[Fig6]
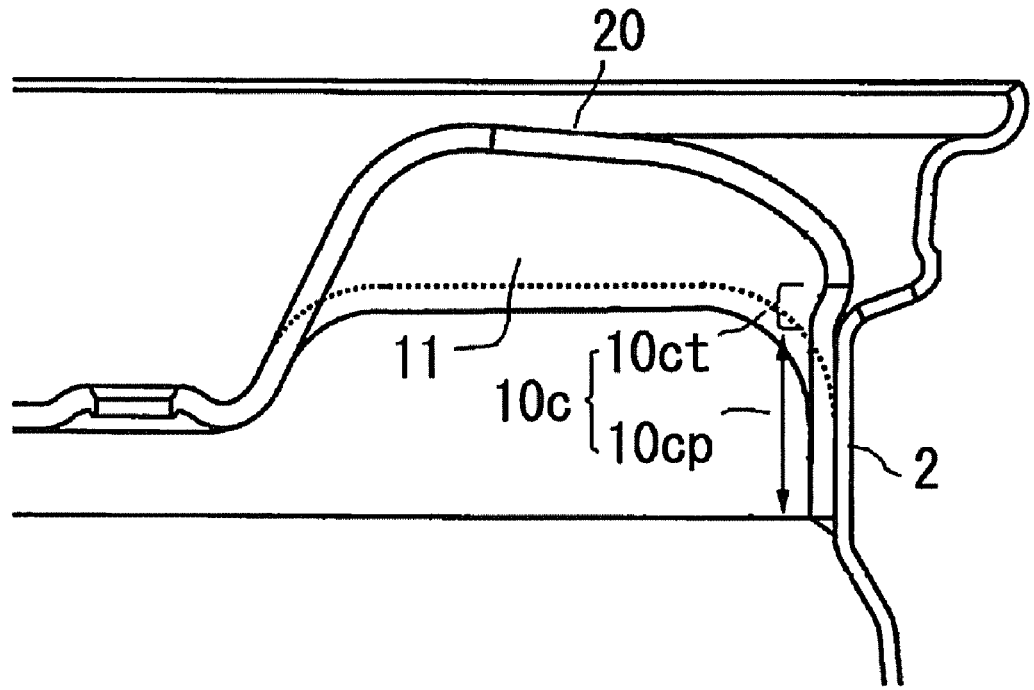
[Fig7]
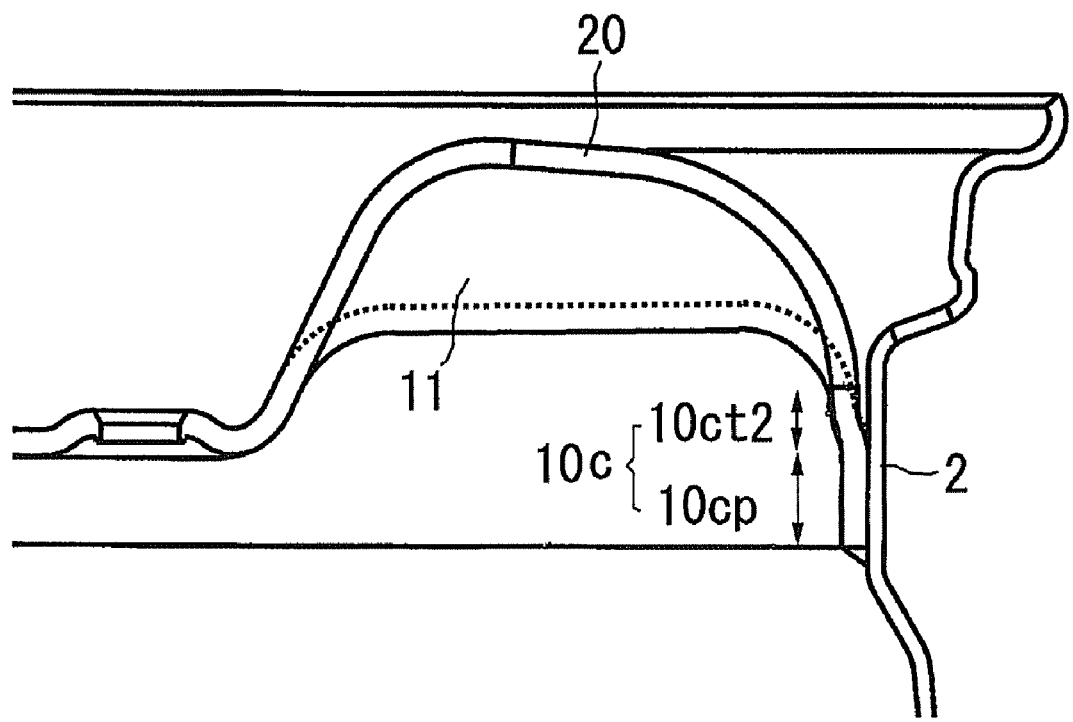

SPOKED WHEEL DISK MANUFACTURING METHOD AND SPOKED WHEEL

FIELD OF THE INVENTION

The present invention relates to a method of manufacturing a spoked wheel disk and a spoked wheel that are used for vehicles, such as automobiles, agricultural vehicles, and industrial vehicles.

DESCRIPTION OF THE RELATED ART

Cheap and low-cost steel wheels have been widely used. However, these steel wheels have a problem with their poor design, compared to aluminum wheels. Thus, in recent years, steel wheels having thin spokes and large decorative holes have been developed to provide a similar appearance to aluminum wheels. (See Patent Documents 1 to 3).

According to the description in the Patent Document 1, a stamped disk is welded to a rim. The stamped disk has spokes formed integrally with a ring portion extending along the entire circumference of the stamped disk. A notch is provided on the ring portion, such that the notch does not interfere with an air stem (valve hole) on the rim when the ring portion is seated on a shoulder portion of the rim to be welded together.

According to the description in the Patent Document 2, a periphery of each decorative hole is subjected to drawing to form a raised wall so as to secure sufficient strength, thereby reducing the width of the spokes which are provided between the adjacent decorative holes. The disk is formed with a disk flange in the circumferential direction, and the disk flange is welded to a rim.

According to the description in the Patent Document 3, a single piece of metal sheet is formed into a disk, and the disk includes a plurality of spokes units and a ring-shaped disk edge that connects the outer ends of the spoke units together. Also according to the Patent Document 3, each of the spoke units includes two spoke bars (reinforcing ribs), and the disk edge is positioned on an inner circumference of a rim well (drop portion) to be joined together.

In contrast, a conventional disk (with small decorative holes) is manufactured from, for example, a square steel plate. The manufacture of the conventional disk includes stamping the square steel plate into a shape having four rounded corners, and subjecting the stamped steel plate to drawing (pressing) to form a disk flange (See Patent Documents 4 and 5). In this case, the four rounded corners of the stamped steel plate each form an end edge of the disk flange, while the other peripheral parts of the stamped steel plate each form a recess which serves as a drain.

[Patent Document 1] Japanese Unexamined Patent application Publication No. 2004-1704
[Patent Document 2] Japanese Unexamined Patent application Publication No. 2005-119355
[Patent Document 3] European Patent No. 1262333 (claims 1 and 3)
[Patent Document 4] Japanese Patent No. 3460764 (FIG. 3)
[Patent Document 5] Japanese Unexamined Patent application Publication No. 2005-35330 (FIG. 3)

PROBLEMS TO BE SOLVED BY THE INVENTION

As described in the Patent Documents 1 to 3, when the disk is manufactured by forming the thin spokes integrally with the large decorative holes on the disk, the decorative holes are formed on the disk after the disk is subjected to the curved surface machining. However, this causes the need for back punching to form holes through both the flat portion of the disk and the disk flange (punching holes in the disk from the backside). Such an extra step increases the number of steps in the manufacture of the disk, resulting in lower productivity.

In contrast, the Patent Document 5 discloses a technique in which decorative holes are formed in advance on a blank material for the disk, and then the blank material is bent to faun a flange. However, according to this technique, the decorative holes (heat radiation holes) are relatively too small to reach an area near the outer periphery of the disk (FIG. 2 in the Patent Document 5). Therefore, the wheel cannot obtain a quality design as high as the design of the aluminum wheel that has large openings between the spokes.

The blank material, on which the decorative holes are formed in advance, can be subjected at its decorative-hole portion to the curving surface machining such that the decorative holes reach the area near the outer periphery of the disk. However, the drawing causes an excess of the blank material in the circumferential direction. Further, the outer periphery of the decorative-hole portion has a smaller material width and a lower strength than the other portions. This causes the decorative-hole portion to be deformed by the curving surface machining, and thus cause the end edge of the disk flange to undulate. This leads to various problems including: defects, such as deteriorated appearance due to the deformed decorative holes, insufficient fitting strength, and low assembly precision; yield reduction of the disk; and poor welding caused by welding a ring portion at the decorative-hole portion.

The present invention has been made to solve the above problems. The object of the present invention is to provide a method of manufacturing a spoked wheel disk and a spoked wheel wherein the spoked wheel disk having integrally-formed spokes and large decorative holes is manufactured with improved productivity, improved quality, and a lower risk of poor welding to a rim.

SUMMARY OF THE INVENTION

In accordance with the present invention, a method of manufacturing a spoked wheel disk comprising: a step of preforming a plurality of bulging portions on a substantially circular plate blank, the bulging portions being located concentrically and circumferentially outward of a bolt hole, each of the bulging portions being a base of a reinforcing portion of a spoke; a step of forming a plurality of prototypical decorative holes on the respective bulging portions to form a prototypically-shaped spoke between the adjacent prototypical decorative holes; a step of forming a disk flange by bending an outer circumferential portion of the plate blank, on which the prototypical decorative holes are formed, at a right angle to be substantially parallel to a wheel axial direction, so that an outer periphery of a resultant decorative hole forms an upper end edge of the disk flange; and a step of forming the spoke by providing the prototypically-shaped spoke with the reinforcing portion.

By this, the bulging portion, which becomes the base of the reinforcing portion of the spoke, is formed prior to fanning the prototypical decorative holes. This facilitates forming the spoke and the disk flange. Also, the disk flange is formed after the prototypical decorative holes are formed on the blank. This avoids the need for back punching to form holes through both a flat part of the disk and the disk flange after the disk flange is formed. Thus, productivity of the disk improves.

Preferably, the step of forming the disk flange further includes substantially recessing a part of an outer circumferential edge of the plate blank, which faces the prototypical decorative hole, radially inward from a first reference circle that passes the other part of the outer circumferential edge of the plate blank which faces a distal end of the prototypically-shaped spoke.

In this embodiment, a shape of the blank is determined so as to cancel deformation of a low-strength part (the outer circumferential edge that faces the decorative hole) of the blank at the time of forming the disk flange. This prevents the outer circumferential edge of the blank, which faces the decorative hole, from being deformed by bending, and accordingly prevents an end edge of the disk flange from undulating. Also, the yield of the disk improves, while defects such as insufficient fitting strength and low assembly precision are prevented.

Preferably, the step of forming the disk flange further includes substantially recessing a middle part of an outer periphery of the prototypical decorative hole radially inward from a second reference circle that passes apart positioned outermost of the outer periphery of the prototypical decorative hole.

In this embodiment, the shape of the blank is determined so as to cancel excessive deformation of a low-strength outer periphery of the prototypical decorative hole at the time of forming the disk flange. This prevents the outer periphery of the prototypical decorative hole from being deformed and undulating by bending, and thus prevents defects such as deteriorated appearance due to the deformed decorative holes, insufficient fitting strength, and low assembly precision, as well as prevents yield reduction of the disk and poor welding caused by welding at a fitting area adjacent to the decorative holes. Additionally, the appearance improves.

A second aspect in accordance with the present invention, a spoked wheel comprising: a rim; and a spoked wheel disk that is manufactured by the method of manufacturing said spoked wheel disk, wherein an outer circumferential surface of a disk flange of the spoked wheel disk is fitted and welded to an inner circumferential surface of the rim.

According to the present invention, a spoked wheel disk having integrally-formed spokes and large decorative holes is manufactured with improved productivity and improved yield, while preventing defects, such as insufficient fitting strength and low assembly precision. Also, the manufacture of the spoked wheel disk is facilitated. Additionally, the appearance improves.

BRIEF DESCRIPTION OF THE DRAWING

FIGS. 1(a) to 1(d) are process step diagrams showing an example of a method of manufacturing a spoked wheel disk according to an embodiment of the present invention;

FIG. 2 is a perspective view of a disk;

FIG. 3 is a sectional view showing an example of a steel wheel for vehicle according to the embodiment of the present invention;

FIG. 4 is a perspective view of a spoked wheel disk using the disk according to the embodiment of the present invention;

FIG. 5 is a perspective view of a spoked wheel disk using a disk according to a modification of the embodiment of the present invention;

FIG. 6 is a sectional view of a fitting area between a rim and a disk according to another embodiment of the present invention; and FIG. 7 is a sectional view of a fitting area between a rim and a disk according to still another embodiment of the present invention.

DESCRIPTION OF THE PREFERRED EMBODIMENTS

Embodiments of the present invention will be described below. In the following description, a steel wheel is applied as an example. However, the present invention covers not only the steel wheel, but also other material (for example, titanium and titanium alloy) wheels, as long as a disk is formed from a circular plate blank by bending an outer periphery of the blank by drawing or the like to form a disk flange.

FIGS. 1(a) to 1(d) are process step diagrams showing an example of a method of manufacturing a spoked wheel disk according to the embodiment of the present invention.

First, a steel plate blank 100 is stamped into a substantially circular shape, and is formed with a hub hole 10d, a plurality of bolt holes 10e, and a plurality of bulging portions 110 each being a base of a reinforcing portion 11 of a spoke (FIG. 1(a)). The hub hole 10d is located at the center of the disk. The bolt holes 10e are located circumferentially outward of the hub hole 10d and concentrically with the hub hole 10d. The bolt holes 10e are used to mount the wheel to the hub. The bulging portions 110 are located concentrically and circumferentially outward of the bolt holes 10e. The number of the bulging portions 110 corresponds to the number of the spokes (five spokes are shown in FIGS. 1(a) to 1(d), and therefore the disk with the five spokes will be hereinafter described). The bulging portions 110 are formed adjacent to one another. A valley portion 113 is formed between the adjacent bulging portions 110, 110, and the valley portion 113 extends in the radial direction while facing the bulging portions 110. Each of the bulging portions 110 is formed so as to protrude in the direction of the reinforcing portion 11 that is raised from a middle portion 13 of the spoke, which will be described later.

The hub hole 10d and the bolt holes 10e may be formed by a hole cutting punch. The bulging portions 110 may be formed by press-drawing. A series of the steps in the present invention may be performed using a transfer press machine in which the blank is transferred through a succession of dies.

Subsequently, prototypical decorative holes 200 are formed on the center of the respective bulging portions 110. The prototypical decorative holes 200 each have a substantially triangle shape with its apex oriented toward the hub hole 10d. Also, an outer circumferential edge 100e of the plate blank 100 is machined into a shape to be described below (FIG. 1(b)). In conjunction with forming the prototypical decorative holes 200, five long pieces of prototypically-shaped spokes 100b are formed between the adjacent prototypical decorative holes 200, 200. The prototypically-shaped spokes 100b extend radially outward from the center of the blank 100. The valley portion 113 extends in the radial direction at the middle of each of the prototypically-shaped spokes 100b.

The outer circumferential edge 100e and the prototypical decorative holes 200 may be formed by the hole cutting punch.

The outer circumferential edge 100e of the plate blank includes: an outer circumferential edge part 100ea that faces the prototypical decorative hole 200; and the other outer circumferential edge part (an outer circumferential edge 100eb that faces a distal end of the prototypically-shaped spoke 100b). In this case, the outer circumferential edge part 100ea is recessed radially inward from a first reference circle C1 that passes the outer circumferential edge 100eb. For details, the outer circumferential edge part 100ea is formed to connect respective ends of the adjacent outer circumferential edges 100eb in a substantially straight line. Also, the outer circumferential edge part 100ea is positioned radially inward from the first reference circle C1 along which the outer circumferential edge 100*eb* is positioned. Therefore, the entire outer circumferential edge 100*e* of the plate blank is in the form of a substantially pentagon.

The distal end of the prototypically-shaped spoke 100*b* is defined as a region between the contact points where two extended lines of the widthwise ends of the prototypically-shaped spoke 100*b* contact with the outer circumferential edge of the blank.

An outer periphery of the prototypical decorative hole (a part of the circumference of the prototypical decorative hole, which faces toward an outer circumferential edge of the blank) includes: a middle outer peripheral part 200*e*; and an outermost part 200*f* that is positioned outermost of the outer periphery of the prototypical decorative hole. In this case, the middle outer peripheral part 200*e* is recessed radially inward from a second reference circle C2 that passes the outermost part 200*f*. For details, the outer peripheral part 200*e* is positioned radially inward from the second reference circle C2 with a constant radial distance (width) from the outer circumferential edge part 100*ea*. Therefore, the outer peripheral part 200*e* extends in straight in a direction substantially parallel to the outer circumferential edge part 100*ea*. In addition, the outermost part 200*f* that is positioned outermost of the outer periphery of the prototypical decorative hole is located adjacent to a corner of the prototypical decorative hole.

Subsequently, the outer circumferential edge 100*e* of the plate blank 100, which has been already machined into the shape shown in FIG. 1(*b*), is bent at a right angle to be substantially parallel to the wheel axial direction, thereby to form a disk flange 10*c* (FIG. 1(*c*)). In the step of forming the disk flange, a bending-point outer circumferential end R (out) is positioned at the same radius from the blank center as the end of the outer peripheral part 200*e* of the prototypical decorative hole or is positioned radially inward from the end of the outer peripheral part 200*e*. In other words, the bending-point outer circumferential end R (out) is positioned on the periphery of the second reference circle C2 or is positioned radially inward from the second reference circle C2.

It should be noted that the reference circles C1 and C2 are concentric about the center of the plate blank 100.

An outer periphery of a resultant decorative hole 20*x* is thereby positioned on the outer circumferential side of a curved-surface connecting portion R, while forming an upper end edge of the disk flange 10*c*.

As described above, the bending point for the disk flange is positioned adjacent to the prototypical decorative hole (or is positioned on a part of the prototypical decorative hole). This allows the outer periphery of the resultant decorative hole 20 to reach an outer periphery of a prototypically-shaped disk 10*x*. Thus, the decorative hole looks larger, thereby improving the design of the wheel. It should be noted that the plate blank that has already been formed with the disk flange 10*c* is referred to as a prototypically-shaped disk for the sake of convenience. Although the prototypically-shaped disk has a shape that is substantially the same as a shape of a final resultant disk, the prototypically-shaped disk is not yet subjected to final machining to the reinforcing portion of the spoke and other portions. Also, the decorative hole 20*x* is slightly different in size from a final resultant decorative hole 20, and therefore is denoted by a different reference numeral.

It should be noted that in the following description, a teen "outside" and a term "inside" respectively refer to an outer part and an inner part of the wheel mounted on the vehicle, when viewed in the wheel axial direction. In a double-tire structure of a truck in which two axially-connected wheels are used, the term "outside" and the term "inside" for an inner one of the wheels respectively refer to, as described above. In contrast, the term "outside" and the term "inside" for the other outer wheel respectively refer to an inner part and an outer part of the wheel. The reason for this is that in the double-tire structure, the outer wheel is turned inside out to be connected to the inner wheel. For example, in the case of the inner wheel, an upper part of the disk shown in FIG. 2 is oriented outside, while in the case of the outer wheel, a lower part of the disk shown in FIG. 2 is oriented outside.

The radial direction of the rim and the disk is represented as "inward" or "outward."

The reasons why the plate blank 100 provided for forming the disk flange is formed into the shape shown in FIG. 1(*b*) will be hereinafter described. As described above, in the present invention, the bending-point outer circumferential end R (out) of the disk flange is positioned adjacent to the prototypical decorative hole 200 (or is positioned on a part of the prototypical decorative hole), so that the decorative hole 20 reaches a periphery of the disk. The outer circumferential edge part 100*ea* of the blank faces the prototypical decorative hole 200. In this case, the outer circumferential edge part 100*ea* has a material width (width $\alpha$ in FIG. 1(*b*)) smaller than a material width (width $\beta$ in FIG. 1(*b*)) of the other outer circumferential edge part 100*eb*. Accordingly, the outer circumferential edge part 100*ea* has strength lower than strength of the other outer circumferential edge part 100*eb*. This causes the outer circumferential edge part 100*ea* to be deformed and stretched in the step of forming the disk flange. Also, the draw forming is performed in the step of forming the disk flange. This causes an excess of the material in the circumferential direction of the disk flange 10*c*. Thus, the end edge of the disk flange undulates.

Therefore, the outer circumferential edge part 100*ea* is positioned inside of the plate blank 100 (radially inward from the first reference circle C1) in advance in order to cancel the excess of the material in the circumferential direction of the outer circumferential edge part 100*ea* and to cancel the deformation and stretching of the outer circumferential edge part 100*ea*. Thus, in consequence of forming the disk flange 10*c*, a lower end 10*c* (in) (the furthest stretched distal end) of the disk flange entirely has a uniform height in the axial direction.

Similarly, since the outer peripheral part 200*e* of the prototypical decorative hole has lower strength, the shape of the outer peripheral part 200*e* is defined to cancel excessive deformation of the outer peripheral part 200*e* at the time of forming the disk flange. This prevents the outer peripheral part 200*e* of the prototypical decorative hole from being deformed and undulating by bending.

Particularly, in this embodiment, the shape of the outer circumferential edge part 100*ea* and the outer peripheral part 200*e* are both defined as described above. Therefore, the outer peripheral part 200*e* is kept at a constant radial distance (width) from the outer circumferential edge part 100*ea*. Also, an upper end 10*c* (out) and the lower end 10*c* (in) of the disk flange 10*c* each have a uniform height in the axial direction.

The outer circumferential edge part 100*ea* and/or the outer peripheral part 200*e* of the prototypical decorative hole have such a shape as to cancel the excess of the material in the circumferential direction and the deformation and stretching. This shape may be determined, for example, by computer simulations, such as finite element method (FEM) analysis, or by preliminary experiments.

The disk flange may be formed by a known machining process that uses, for example, a certain die and a drawing punch. The disk flange may also be subjected to ironing in addition to the bending, thereby to further extend the disk flange.

Subsequently, the prototypically-shaped spoke 100b of the prototypically-shaped disk 10x is subjected to pressing and bending to be provided with the reinforcing portions 11, 11 that extend in a longitudinal direction, thereby to form a spoke 10b (FIG. 1(d)). Other machining processes are also performed in this step to manufacture a final resultant disk 10.

As shown in FIG. 2, each of the reinforcing portions 11, 11 includes a first reinforcing part 11a and a second reinforcing part 11b, and the reinforcing portions 11, 11 are formed along the widthwise ends of the spoke 10b. The second reinforcing part 11b is raised (bulges) toward the outside of the disk 10 (upward from the plane of the drawing sheet of FIG. 1). Also, a raised portion 14 and a connecting portion 15 are formed on an outer periphery of a hub mounting portion 10a (an area surrounding the bolt holes 10e) of the disk. The raised portion 14 continues from the second reinforcing part 11b of the spoke 10b and connects to the connecting portion 15. These elements are formed together into a rib that encloses the two sides and the apex of the decorative hole 20. The connecting portion 15 extends substantially parallel to the hub mounting portion 10a, and connects the first reinforcing parts 11a of the adjacent spokes to each other.

The widthwise middle portion 13 of the spoke are surrounded by the reinforcing portions 11, 11 along the widthwise ends of the spoke. The widthwise middle portion 13 is positioned to be recessed toward the inside of the wheel relative to the reinforcing portion 11. The curved-surface connecting portion R is formed by bending. The curved-surface connecting portion R widens from its proximal end toward its outer circumferential side, and is connected to the disk flange 10c. The disk flange 10c extends in the wheel axial direction. The disk flange 10c is formed with a surface extending in the wheel axial direction to be fitted and welded to the rim. The disk flange 10c has a function of connecting the individual spokes 10b together to ensure sufficient strength.

FIG. 2 is a perspective view of the disk 10. In FIG. 2, the hub mounting portion 10a of the disk 10 substantially lies on a flat plane. In contrast, the spoke 10b extends from the hub mounting portion 10a, bends toward the outside, extends substantially parallel to the hub mounting portion 10a, bends toward the inside at the curved-surface connecting portion R, and then connects to the disk flange 10c.

As described above, according to the present invention, the bulging portion of a base of the reinforcing portion of the spoke is formed prior to forming the prototypical decorative hole. This facilitates forming the spoke and the disk flange. Also, the disk flange is formed after the prototypical decorative hole is formed on the blank. This avoids the need for back punching to form holes through both a flat part of the disk and the disk flange after the disk flange is formed. Thus, productivity of the disk improves. In addition, the outer periphery of the decorative hole is prevented from being significantly deformed by bending, and accordingly the end edge of the disk flange is prevented from undulating. This improves yield of the disk, while preventing defects, such as insufficient fitting strength and low assembly precision.

Also, In the present invention, when the step of forming the disk flange is performed using the plate blank in which the outer circumferential edge part 100ea of the plate blank, which faces the prototypical decorative hole, is recessed radially inward from the first reference circle, the undulation of the lower end 10c (in) of the disk flange will be eliminated. Further, when the step of forming the disk flange is performed using the plate blank in which the middle outer peripheral part of the prototypical decorative hole is recessed radially inward from the second reference circle, the deformation and the undulation of the outer peripheral part 200e of the prototypical decorative hole by bending will be eliminated. Furthermore, when the outer circumferential edge of the plate blank and the outer periphery of the prototypical decorative hole both have the predetermined shape described above, the lower end 10c (in) and the upper end 10c (out) of the disk flange respectively become a substantially uniform height in the axial direction. Accordingly, the disk flange 10c itself has a uniform width.

A spoked wheel of the present invention will be described below with reference to FIG. 3. The spoked wheel of the present invention is formed by fitting an outer circumferential surface of the disk flange 10c of the disk 10 to an inner circumferential surface of the rim 2 and welding them together.

In FIG. 3, the rim 2 is in a substantially cylindrical shape and has an outside flange. Inside of the outside flange of the rim 2, an outside bead seat is formed in which a tire bead is seated. Inside of the outside bead seat, a smallest-diameter drop portion 2c is formed. The outside bead seat and (an outside part of) the drop portion 2c are connected to each other smoothly through a side wall 2a. More specifically, the drop portion 2c and the side wall 2a are connected to each other through a bent portion 2b. The bent portion 2b is semicircular in cross section. An inside bead seat is formed inside of the drop portion 2c through a side wall. The inside bead seat is connected to an inside flange. In the following description, a term "drop portion" refers to an outside part of the drop portion (a connecting part to the outside bead seat). A tire is housed between the outside flange and the inside flange that are formed on the both ends of the rim 2.

The rim 2 may be manufactured, for example, by rolling up a rolled shape steel of a predetermined shape into a cylindrical form or by rolling up a steel plate into a cylindrical form and then subjecting the cylindrical steel plate cylinder to roll forming or the like into a predetermined cross sectional shape. However, the present invention is not limited to these manufacturing methods.

In the embodiment of the present invention, the rim 2 and the disk 10 are joined together by fitting the outer circumferential surface of the disk flange 10a to the inner circumferential surface of the drop portion 2c of the rim 2, and by welding the outside part of the fitting area to form a welded part 5. However, the outer circumferential surface of the disk flange 10a may be fitted and welded to an inner circumferential surface of any portion of the rim 2, other than the drop portion 2c.

The present invention is not limited to any particular welding method, but may use any welding methods including, for example, laser welding, plasma welding, $CO_2$ arc welding, metal active gas (MAG) welding, submerged arc welding, and tungsten inert gas (TIG) welding. However, in the case that the welded part appears on the outside surface of the wheel, the laser welding, the plasma welding or the TIG welding may be preferably used for providing a more aesthetic appearance to a welded bead surface. Particularly, hot wire TIG welding or the submerged arc welding may be preferred in view of cost, reliable weld strength, and appearance.

The disk flange 10c may extends in the wheel axial direction parallel to the drop portion 2c of the rim. Alternatively, the disk flange 10c may extend with its diameter slightly increasing at the distal end in order to tightly fit the disk flange 10c to the rim 2.

Welding the outside part of the fitting area is more preferred for improving the weld strength of the welded part than welding the inside part of the fitting area. The conceivable reasons for this are as follows: Since the rotating disk is deformed into an elliptical shape, stress is applied in the radial direction of the disk, causing the fitting area between the disk 10 and the rim 2 to be widened (extend laterally). It is therefore conceivable that in the case of welding the inside part of the fitting area, the stress that causes the fitting area to be widened is transmitted from the outside part of the fitting area to the welded part, and the stress to be applied to the welded part increases due to the principle of leverage.

In contrast, in the case of welding the outside part of the fitting area, the stress that causes the fitting area to be widened is merely exerted directly on the welded part or the outside part of the fitting area. Therefore, the lower stress is applied to the welded part, compared to the case of welding the inside part of the fitting area.

FIG. 4 is a perspective view of the fitting area between the disk and the rim. In the present invention, the decorative hole 20 extends to the outer circumference of the disk. Thus, the spoke looks as if it connects directly to the rim. This improves the design of the wheel.

FIG. 5 shows a modification of the reinforcing portion of the spoke. In the embodiment shown in FIG. 5, a widthwise middle portion 13y is enclosed by the reinforcing portions 11y, 11y which are widthwise ends of the spoke 10b2. However, unlike the embodiment shown in FIG. 2 and FIG. 4, the widthwise middle portion 13y protrudes toward the outside of the wheel relative to the reinforcing portion 11y.

In this modification, in the preforming step, each of the bulging portions 110 is also formed so as to protrude in the direction of the reinforcing portion being raised from the middle portion of the spoke to be described later. However, the spoke 10b2 according to this modification is provided in a positional relationship with the spoke 10b shown in FIG. 4 such that the spoke 10b2 is turned inside out to become the spoke 10b and vice versa. Therefore, the bulging portion 110 protrudes toward the inside of the wheel.

Also, as shown in FIG. 6, the disk flange 10c may include a fitting disk flange part 10cp and a connecting disk flange part 10ct. The fitting disk flange part 10cp extends parallel to a corresponding fitting part of the rim 2. The connecting disk flange part 10ct connects to the reinforcing portion 11 of the spoke and to the decorative hole 20. In this case, the connecting disk flange part 10ct has, at its distal end, a diameter that increases toward the reinforcing portion 11 of the spoke and the decorative hole 20. The reinforcing portion 11 of the spoke and the decorative hole 20 are connected to the distal end of the connecting disk flange part 10ct.

Also, as shown in FIG. 7, the disk flange 10c may include a fitting disk flange part 10cp and a connecting disk flange part 10ct2. The fitting disk flange part 10cp extends parallel to the corresponding fitting part of the rim 2. The connecting disk flange part 10ct2 connects to the reinforcing portion 11 of the spoke and to the decorative hole 20. In this case, the connecting disk flange part 10ct2 has, at its distal end, a diameter that decreases toward the reinforcing portion 11 of the spoke and the decorative hole 20. The reinforcing portion 11 of the spoke and the decorative hole 20 are connected to the distal end of the connecting disk flange part 10ct.

The disk flange 10c shown in FIG. 6 and FIG. 7 may be manufactured in the step of FIG. 1(c) or the step of FIG. 1(d), or immediately after the step of FIG. 1(c) or the step of FIG. 1(d).

The present invention is not limited to the aforementioned embodiments. For example, the shape of the outer circumferential edge of the blank and the shape of the outer periphery of the prototypical decorative hole may be changed depending on the degree of the machining for forming the disk flange, as long as the shapes allows for cancelling deformation and stretching of these outer circumferential edge and outer periphery so that, in consequence of forming the disk flange, its upper and lower ends respectively have a substantially uniform height in the axial direction.

The present invention is not limited to a specific shape of the spokes or to a specific shape of the decorative holes. In addition, the present invention is not limited to a specific number of the spokes or to a specific number of the decorative holes, as long as a plurality of the spokes and a plurality of the decorative holes are provided. Further, the present invention is not limited to a specific shape or a specific number of the reinforcing portions of the spokes. Furthermore, an additional hole may be formed on the spokes for weight reduction.

What is claimed is:

1. A method of manufacturing a spoked wheel disk comprising:
    a step of preforming a plurality of bulging portions on a substantially circular plate blank, the bulging portions being located concentrically and circumferentially outward of a bolt hole, each of the bulging portions being a base of a reinforcing portion of a spoke;
    a step of forming a plurality of prototypical decorative holes on the respective bulging portions to form a prototypically-shaped spoke between the adjacent prototypical decorative holes;
    a step of forming a disk flange by bending an outer circumferential portion of the plate blank, on which the prototypical decorative holes are formed, at a right angle to be substantially parallel to a wheel axial direction, so that an outer periphery of a resultant decorative hole forms an upper end edge of the disk flange, wherein the step of forming the disk flange further includes substantially recessing a part of an outer circumferential edge of the plate blank, which faces the prototypical decorative hole, radially inward from a first reference circle that encircles a part of the outer circumferential edge of the plate blank which faces a distal end of the prototypically-shaped spoke; and
    a step of forming the spoke by providing the prototypically-shaped spoke with the reinforcing portion.

2. The method of manufacturing a spoked wheel disk according to claim 1, wherein the step of forming the disk flange further includes substantially recessing a middle part of an outer periphery of the prototypical decorative hole radially inward from a second reference circle which is concentric to the first reference circle by a constant radial distance.

* * * * *